Patented Feb. 23, 1943

2,311,887

UNITED STATES PATENT OFFICE 2,311,887

PROCESS FOR THE PRODUCTION OF TOCOPHERYLLIKE COMPOUNDS

Max Tishler, Rahway, and Clarence C. Christman, Colonia, N. J., assignors to Merck & Co., Inc., Rahway, N. J., a corporation of New Jersey No Drawing. Application February 7, 1941, Serial No. 377,844

3 Claims. (Cl. 260—338)

This invention relates to tocopheryl compounds, and to improved processes for the production of pure synthetic α-tocopherol.

α-Tocopherol, an antisterility compound may be prepared by reacting phytol or a phytyl halide with 2,3,5 - trimethyl hydroquinone (2,3,5 - trimethyl p-dihydroxy-benzene) in the presence of an acidic substance. The known methods for isolating and purifying crude α-tocopherol are:

(1) Distillation of the mixture under highly reduced pressure
(2) A series of chromatographic adsorptions Both of these prior art methods possess disadvantages which are objectionable from the practical manufacturing standpoint.

The first mentioned method is tedious, and requires redistillation in order to obtain a pure product. The second method requires cumbersome equipment, and furthermore, α-tocopherol tends to become air-oxidized during chromatographic adsorption.

We have now discovered a method for purifying crude α-tocopherol without resort to either distillation or chromatographing.

According to our invention, the crude α-tocopherol is oxidized, preferably by means of either ferric chloride or gold chloride, to 2,5,6-trimethyl-3-(γ-hydroxy-β,γ-dihydrophytyl) - 1,4-benzoquinone, which is then reduced, for example, by sodium hydrosulfite or by catalytic hydrogenation. The 2,5,6-trimethyl-3-(γ-hydroxy-β,γ-dihydrophytyl) - 1,4 - dihydroxybenzene thus obtained is a solid, which is insoluble in petroleum ether, and, therefore, can be readily isolated from the oxidation reaction mixture, and is easily purified. It is surprising that the said 1,4-dihydroxybenzene occurs as a solid, because 2,5,6-trimethyl-3-(γ - hydroxy - β,γ - dihydrophytyl)-1,4-benzoquinone itself is a liquid which does not solidify even at −25° C. Our new 1,4-dihydroxybenzene is characterized as a white, waxy-like solid melting at about 84–86° C., and which rapidly becomes colored on exposure to air due to oxidation.

Our new 1,4-dihydroxybenzene forms a crystalline diacetate which occurs in the form of needles melting at 65° C. and has the formula

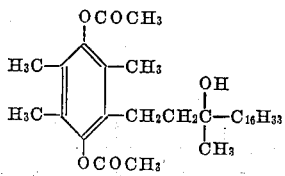
I when it is reductively acetylated with acetic anhydride, zinc dust, and pyridine at 0° C. When this diacetate is treated with a halogenating agent, such as acetyl chloride or acetyl bromide, sulfuryl chloride, sulfuryl bromide, hydrogen chloride, hydrogen bromide, etc., the corresponding halides of the formula

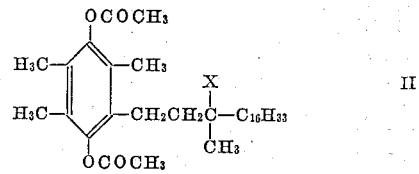
II where X is halogen, are formed. The bromide occurs as miscroscopic platelets melting at about 75–76° C. The chloride occurs as fine microscopic needles melting at about 76–77° C.

The pure 2,5,6-trimethyl-3-(γ-hydroxy-β,γ-dihydrophytyl)-1,4-dihydroxybenzene is then cyclized to the chromane, α-tocopherol. The cyclization step of our process is highly important. We have discovered that if this step is carried out using specific substances, the α-tocopherol obtained is pure and free from dark color. According to our invention, the preferred reagents for the cyclization step are (1) Stannous chloride, hydrochloric acid, and dioxane; or
(2) Zinc chloride, acetic acid, and small amounts of zinc dust.

Known mixtures of reagents for the cyclization of hydroquinones to chromanes, such as zinc dust, acetic acid and hydrobromic acid, are unsuitable for our purposes. We have found that the use of such mixtures, even with very pure 1,4-dihydroxybenzene, results in a dark-colored product which cannot be purified even by distillation.

The steps of our new process for the production of pure α-tocopherol may be illustrated by the following flow-sheet:

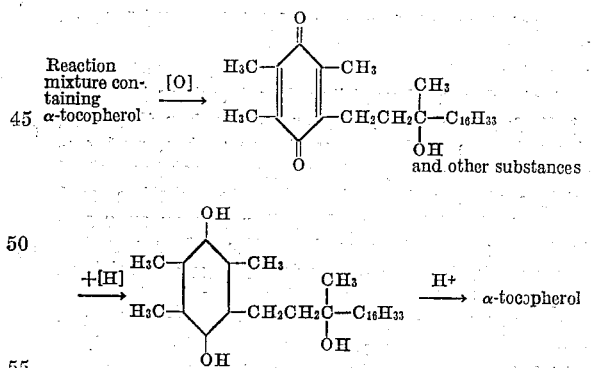

The α-tocopherol thus produced is pure and shows the usual biological response in rats when fed at a 3 mg. dose.

The following examples will illustrate methods of carrying out the present invention, but it is to be understood that these examples are given by way of illustration and not of limitation.

*Example I*

To a solution of 10 grams of a crude reaction mixture containing α-tocopherol is added a solution of 13.5 grams of ferric chloride hexahydrate in 85% methyl alcohol. After standing for about 15 minutes at room temperature, the mixture is heated to boiling for 5 minutes and then diluted with water. The mixture is extracted with ether, and the ether layer after washing with water is concentrated to a reddish oil. The oil is suspended in 100 cc. methanol and to the mixture is added a fresh solution of 10 grams of sodium hydrosulfite in 20 cc. water. (The reduction may also be accomplished by bubbling hydrogen through the mixture in the presence of Raney's nickel, or catalysts prepared from platinum or palladium.) After shaking for ½ hour the mixture is diluted with three volumes of water and then extracted with ½ volume of petroleum ether. The petroleum ether extract is then chilled at 0° C. whereby the 2,5,6-trimethyl-3-(γ-hydroxy-β,γ-dihydrophytyl)-1,4-(dihydroxybenzene separates as a white waxy solid. The mixture is centrifuged, the mother liquor decanted, the solid washed well with cold petroleum ether, and the mixture centrifuged again. By repeating this process several times, the 1,4-dihydroxybenzene is obtained substantially pure.

The solid 1,4-dihydroxybenzene is then dissolved in 50 cc. dioxane, and to this is added 5 grams of stannous chloride and 7 cc. concentrated hydrochloric acid. The mixture is boiled under reflux for six hours. The colorless mixture is diluted with water and extracted with petroleum ether. The petroleum ether layer is washed with water, dried over anhydrous magnesium sulfate, and concentrated under reduced pressure. The residue, which is very pale yellow, is substantially pure α-tocopherol.

In place of dioxane, stannous chloride and hydrochloric acid, a mixture of acetic acid, zinc chloride and zinc dust may be used. In the latter instance, the reaction product is diluted with water, extracted with petroleum ether, the latter washed with aqueous sodium bicarbonate, dried over magnesium sulfate, and concentrated to dryness.

The α-tocopherol isolated in this manner shows the usual biological response in rats when fed at a 3 mg. dose.

*Example II*

A mixture of 1 gm. of 2,5,6-trimethyl-3-(γ-hydroxy-β,γ-dihydrophytyl)-1,4-dihydroxybenzene, 1 gm. of zinc dust, 10 cc. of acetic anhydride, and six drops of pyridine is stirred by hand at 0° C. for one hour. After separating the zinc, the mixture is diluted with ice water, and extracted with ether. The ether extract is washed with water, sodium bicarbonate solution and dilute hydrochloric acid. After drying over anhydrous magnesium sulfate, the ether solution is concentrated to an oil which soon crystallizes. The 2,5,6-trimethyl-3-(γ-hydroxy-β,γ-dihydrophytyl)-1,4-dihydroxybenzene diacetate is recrystallized from a small amount of ethanol, in which it is quite soluble. The diacetate separates as needles melting at about 65° C.

*Example III*

One gram of crude α-tocopherol is oxidized with gold chloride, and subjected to reductive acetylation by the method outlined above. Without crystallizing the product, the oily diacetate is dissolved in 5 cc. acetyl bromide and allowed to stand at room temperature for 14 hours. The mixture is then added cautiously to ice water and extracted with ether. After washing the ether extracts with water, and with aqueous sodium bicarbonate, they are concentrated to an oil. On the addition of 1 cc. of ether and 4 cc. of methanol, crystallization sets in. The 2,5,6-trimethyl-3-(γ-bromo-β,γ-dihydrophytyl)-1,4-dihydroxybenzene diacetate separates as microscopic platelets which melt at about 75–76° C.

The bromide is recrystallized by dissolving in a small amount of warm ether and adding two volumes of methanol. The melting point is not altered by recrystallization. A solution of 100 mgs. of the bromide in 1 cc. carbon tetrachloride shows no optical rotation in a polarimeter.

*Example IV*

One gram of crude α-tocopherol is converted into the oily diacetate, and then allowed to stand with acetyl chloride at room temperature for 14 hours. The product is worked up in the same manner as the corresponding bromide described above. The 2,5,6-trimethyl-3-(γ-chloro-β,γ-dihydrophytyl)-1,4-dihydroxybenzene diacetate is recrystallized from ether-methanol, and melts at 76–77° C. When warmed with alcoholic silver nitrate, silver chloride precipitates.

*Example V*

One gram of 2,5,6-trimethyl-3-(γ-hydroxy-β,γ-dihydrophytyl)-1,4-dihydroxybenzene diacetate is added to 25 cc. of a saturated solution of hydrogen chloride in acetic acid. After standing in the refrigerator for 14 hours, the solution is added to ice-water and worked up as in the case of the acetyl chloride reaction. The yield of chloride is almost quantitative and it melts at 75–76° C. Upon recrystallization from ether-methanol it melts at 76–77° C. and shows the same crystal structure as the 2,5,6-trimethyl-3-(γ-chloro-β,γ-dihydrophytyl)-1,4-dihydroxybenzene diacetate described in Example IV. (Fine microscopic needles.) A mixed melting point of the two chlorides shows no depression.

*Example VI*

The addition of hydrogen bromide to the 2,5,6-trimethyl-3-(γ-hydroxy-β,γ-dihydrophytyl)-1,4-dihydroxybenzene diacetate is carried out in 40% hydrogen bromide in acetic acid. As a two phase system is formed, the mixture is shaken for 18 hours, during which time a solid separates. The product, obtained in almost quantitative yield, melts at 67–68° C. It has the following probable formula

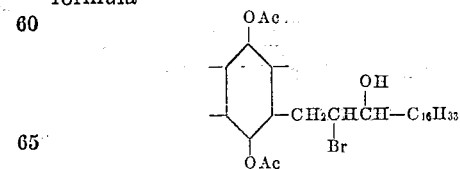

A careful fractionation from ether-methanol and from ether itself, separates the mixture into a less soluble bromide (M. P. 75–76°) which shows no melting point lowering when mixed with the bromide described in Example III, and a more soluble fraction melting at 65–66° C.

Modifications may be made in carrying out the present invention without departing from the spirit and scope thereof, and we are to be limited only by the appended claims.

We claim as our invention:

1. The process comprising oxidizing crude α-tocopherol, reducing the 2,5,6-trimethyl-3-(γ-hydroxy-β,γ-dihydrophytyl)-1,4-benzoquinone thus produced, isolating and purifying the solid 1,4-dihydroxy benzene obtained, cyclizing the same to a chromane by treatment with stannous chloride, hydrochloric acid, and dioxane, and recovering pure α-tocopherol.

2. The process comprising cyclizing 2,5,6-trimethyl-3-(γ-hydroxy-β,γ-dihydrophytyl)-1,4-dihydroxy benzene by treatment thereof with stannous chloride, hydrochloric acid, and dioxane, and recovering pure α-tocopherol.

3. The process comprising cyclizing 2,5,6-trimethyl-3-(γ-hydroxy-β,γ-dihydrophytyl)-1,4-dihydroxy benzene by treatment thereof with stannous chloride, hydrochloric acid, and dioxane at an elevated temperature, and concentrating a petroleum-ether extract of the mixture to obtain pure α-tocopherol.

MAX TISHLER.
CLARENCE C. CHRISTMAN.